E. N. COWDERY.
Windmill.

No. 217,067. Patented July 1, 1879.

WITNESSES:
Achilles Schehl.
C. Sedgwick

INVENTOR:
E. N. Cowdery
BY Munn & Co
ATTORNEYS.

UNITED STATES PATENT OFFICE.

EDWIN N. COWDERY, OF KALAMAZOO, MICHIGAN, ASSIGNOR TO HIMSELF AND CORTLAND CARLTON, OF SAME PLACE.

IMPROVEMENT IN WINDMILLS.

Specification forming part of Letters Patent No. 217,067, dated July 1, 1879; application filed March 14, 1879.

*To all whom it may concern:*

Be it known that I, EDWIN N. COWDERY, of Kalamazoo, in the county of Kalamazoo and State of Michigan, have invented a new and useful Improvement in Windmills, of which the following is a specification.

The object of my invention is to construct a windmill so as to be self-regulating to the velocity of the wind; and the invention consists in a windmill having its wheel and vane hung upon horizontal trunnions, whereby the wheel will be balanced normally by the vane, and may be swung to present the edge of the wheel more or less to the wind. A weighted arm is connected to the vane-staff so as to move with the staff and wheel, and balance the parts in whatever position they may be turned by the wind.

Figure 1:
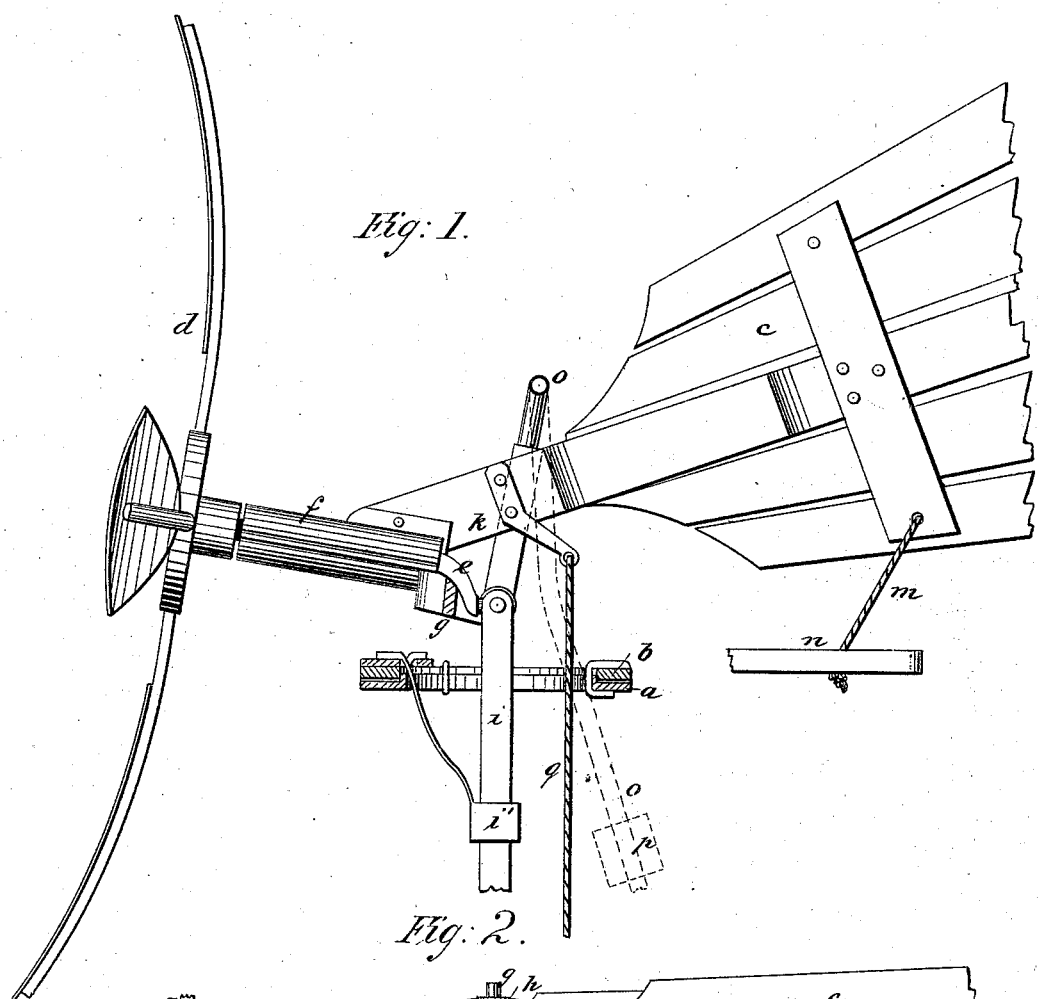
Figure 2:
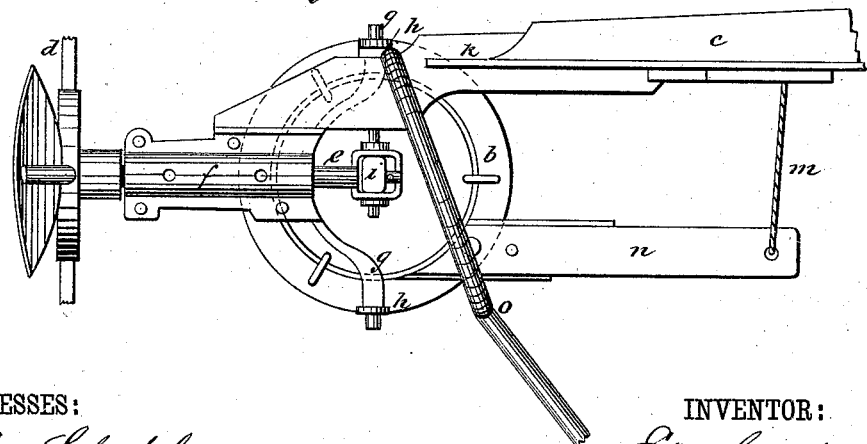

My improved windmill is shown in the accompanying drawings, wherein Figure 1 is a sectional elevation. Fig. 2 is a plan view.

Similar letters of reference indicate corresponding parts.

The ring or plate $a$ is attached rigidly to the top of the tower or building, and supports the corresponding plate $b$, that is fitted to turn on $a$ by the action of the vane $c$, to bring the wheel $d$ to the wind, as usual. The shaft $e$ of wheel $d$ is fitted in a box, $f$, that is formed at the inner end with side arms or trunnions, $g\ g$, that enter bearings in standards $h\ h$ on plate $b$.

The shaft $e$ is formed with a crank, to which is connected the pump-rod $i$. The upper end of $i$ is sustained laterally by a socket, $i'$, at the end of an arm that projects from plate $b$, and this arm is connected to $b$ by a loose joint, that permits movement sidewise of the rod as the wheel-shaft swings on its trunnions.

The vane-staff $k$ is attached rigidly to one side of box $f$, and extends backward in line of shaft $e$, and the vane is proportioned to nearly balance the wheel and shaft on the trunnions $g$, the wheel overbalancing the vane enough to bring shaft $e$ to a nearly horizontal position normally, as shown.

The shaft $e$ and box $f$ are retained in a slightly-inclined position by a cord, $m$, extending from the vane to an arm, $n$, projecting from plate $b$, whereby the upper part of the wheel is thrown back, so that the wind will act when it has unusual force to throw the wheel to a more inclined position.

At one side of staff $k$, above trunnions $g$, is attached a rod or arm, $o$, that extends downward and carries an adjustable weight, $p$. The rod $o$ is bent in the direction of the vane, whereby the weight acts with the vane to balance the wheel; but as the shaft $e$ is raised vertically by the force of wind on the wheel, and the weight of the wheel thereby brought nearer to the center of gravity, the arm $o$ and weight $p$ shift to the opposite side of trunnions $g$, and act to balance the vane.

By these means the wheel will be balanced in any position and returned to its normal position in proportion as the wind decreases.

It will be seen that the windmill is self-regulating to the velocity of the wind.

The pump-rod will have its greatest movement when the wheel is presented fully to the wind, but the crank will act in any position of the wheel.

As a means for throwing the wheel wholly or partially out of action, a cord, $g$, is attached to the vane-staff in a position where, by pulling upon it, the wheel may be swung up to present its edges to the wind.

Having thus described my invention, I claim as new and desire to secure by Letters Patent—

1. The combination of the box $f$, provided with trunnions $g$, the wheel-shaft $e$, connected directly to the pump-rod by a crank, the vane $c$, attached rigidly to the box $f$, the bar $n$, pump-rod $i$, and rope $m$, with the plate $b$, provided with bearings $h$, substantially as and for the purpose set forth.

2. The combination, with the wheel $d$ and vane $c$, hung upon the trunnions $g$, substantially as described, of the weighted rod $o$, as and for the purposes set forth.

EDWIN N. COWDERY.

Witnesses:
 WILSON B. FULLER,
 DALLAS BONDEMAN.